United States Patent
Meier et al.

(10) Patent No.: US 9,289,935 B2
(45) Date of Patent: Mar. 22, 2016

(54) PROCESS FOR HOMOGENIZING AND PELLETIZING A POLYETHYLENE COMPOSITION

(75) Inventors: Gerhardus Meier, Frankfurt am Main (DE); Ulf Schueller, Frankfurt am Main (DE); Jens Wiesecke, Heidelberg (DE); Decio Malucelli, Ferrara (IT); Marco Consalvi, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 88 days.

(21) Appl. No.: 14/116,087

(22) PCT Filed: May 8, 2012

(86) PCT No.: PCT/EP2012/058409
§ 371 (c)(1),
(2), (4) Date: Feb. 3, 2014

(87) PCT Pub. No.: WO2012/152775
PCT Pub. Date: Nov. 15, 2012

(65) Prior Publication Data
US 2014/0145376 A1     May 29, 2014

Related U.S. Application Data

(60) Provisional application No. 61/507,922, filed on Jul. 14, 2011.

(30) Foreign Application Priority Data

May 10, 2011     (EP) ..................................... 11003895

(51) Int. Cl.
| | | |
|---|---|---|
| B29C 47/00 | (2006.01) | |
| B29C 47/68 | (2006.01) | |
| C08F 2/00 | (2006.01) | |
| C08F 6/26 | (2006.01) | |
| C08L 23/04 | (2006.01) | |
| C08L 23/06 | (2006.01) | |
| B29B 9/06 | (2006.01) | |
| C08F 110/02 | (2006.01) | |

(52) U.S. Cl.
CPC ......... *B29C 47/0066* (2013.01); *B29C 47/0004* (2013.01); *B29C 47/0011* (2013.01); *B29C 47/68* (2013.01); *C08F 2/001* (2013.01); *C08F 6/26* (2013.01); *C08L 23/04* (2013.01); *C08L 23/06* (2013.01); *B29B 9/06* (2013.01); *C08F 110/02* (2013.01)

(58) Field of Classification Search
None
See application file for complete search history.

(56) References Cited

U.S. PATENT DOCUMENTS

| | | | |
|---|---|---|---|
| 5,998,006 A | 12/1999 | Bambara et al. | |
| 6,433,086 B1 * | 8/2002 | Swain | 525/171 |
| 2009/0062427 A1 * | 3/2009 | Tornow et al. | 523/223 |
| 2010/0093953 A1 * | 4/2010 | Kolling et al. | 526/96 |
| 2011/0062108 A1 * | 3/2011 | Berthold et al. | 215/329 |

FOREIGN PATENT DOCUMENTS

CN         102015784 A        4/2011

OTHER PUBLICATIONS http://www.rayomand.com; accessed Nov. 9, 2015 for evidence only.*
PCT International Search Report & Written Opinion mailed Aug. 17, 2012, for PCT/EP2012/058409.

* cited by examiner

*Primary Examiner* — Monica Huson

(57) ABSTRACT

A process for homogenizing and pelletizing a polyethylene composition comprising the steps of
a) providing a polyethylene composition having a density of from 0.90 g/cm$^3$ to 0.97 g/cm$^3$ and a melt flow rate $MFR_{21.6}$ at 190° C. under a load of 21.6 kg of from 1 g/10 min to 80 g/10 min,
b) melting the polyethylene composition;
c) passing the melt through a combination of screens consisting of screens having a mesh opening of at least 205 µm and comprising at least two screens having a mesh opening of from 205 µm to 350 µm; and
e) pelletizing the molten polyethylene composition,
the use of a polyethylene composition obtained by such a process for the preparation of films, fibers, pipes, blow-molded articles, injection-molded articles, compression-molded articles or rotomolded articles and films, fibers, pipes, blow-molded articles, injection-molded articles, compression-molded articles or rotomolded articles prepared from a polyethylene composition obtained by such a process.

8 Claims, No Drawings

PROCESS FOR HOMOGENIZING AND PELLETIZING A POLYETHYLENE COMPOSITION

This application is the U.S. National Phase of PCT International Application PCT/EP2012/058409, filed May 8, 2012, claiming priority of European Patent Application No. 11003895.7, filed May 10, 2011, and claiming the benefit under 35 U.S.C. 119(e) of U.S Provisional Application No. 61/507,922, filed Jul. 14, 2011, the contents of which are incorporated herein by reference in their entirety.

FIELD OF THE INVENTION

The present invention relates to a process for homogenizing and pelletizing a polyethylene composition by melting the polyethylene composition and passing the melt through a combination of screens, the use of a polyethylene composition obtained by such a process for the preparation of films, fibers, pipes, blow-molded articles, injection-molded articles, compression-molded articles or rotomolded articles and films, fibers, pipes, blow-molded articles, injection-molded articles, compression-molded articles or rotomolded articles prepared from a polyethylene composition obtained by such a process.

BACKGROUND OF THE INVENTION

Polyethylene is the most widely used commercial polymer. It can be converted to finished articles by a couple of different processes. A major application for polyethylene is for example preparing films. An important factor which influences the quality of the polymer films is the number of visible defects in the films, the so-called gels. The more gels are present in the film the lower is its value. Above a certain boundary value such films can even be unmarketable. Gels and especially larger gels are however not only disadvantageous for preparing films but also for other applications of polyethylene because they can impair, for examples, surface quality or even mechanical properties of produced articles.

Gels in polyethylenes can come from several sources. They can be caused, for example, by residues from catalysts or additives or by contamination. They can be the result of crosslinked material, e.g. caused by overheating. Gels can however also be the result of non-homogenized high-molecular weight fractions, for example in bimodal or multimodal resins. There have been many approaches to reduce the number of gels in polymer films. One of them, especially for reducing the number of gels caused by non-homogenized high-molecular weight fractions, is filtering the polymer melt.

WO 98/24843 A1 teaches a method for reducing the number and size of polymeric gels in polypropylene blends by passing the polypropylene blend through a plurality of screen filters, each screen filter having openings of 44 μm to 900 μm.

EP 848 036 A1 discloses a process for preparing a polyethylene blend by preparing two polyethylenes, blending them, melting the blend and, prior to extrusion or pelletizing, passing the molten blend through one or more active screens of a retention size in the range of 2 nm to 70 μm. WO 2004/101674 A1 also discloses melt screening multimodal polyethylene compositions prepared in a cascade of fluidized bed reactors through one or more active screens having a retention size in the range of 2 μm to 70 μm.

WO 2007/053258 A1 teaches a process of producing a polyolefin by providing a polyolefin; forming a melt of the polyolefin and passing the polyolefin through one or more active screen filter(s) having a mesh size of from 70 μm to 200 μm at a mass flux of from 3,500 kg/hr/m² to 70,000 kg/hr/m²; and isolating the polyolefin having passed through the screen filter.

All these methods for reducing the number of larger gels in polyethylene films require relatively fine screens which are mechanically less stable than coarser screen and which have a higher tendency for plugging than coarser screens.

Thus, it was the object of the present invention to overcome the disadvantages of the prior art and to find a method for reducing the amount of larger gels in polyethylene compositions with mechanically more stable screens and a lower risk of plugging of the screens.

SUMMARY OF THE INVENTION

We have found that this object is achieved by a process for homogenizing and pelletizing a polyethylene composition comprising the steps of
a) providing a polyethylene composition having a melt flow rate $MFR_{21.6}$ at 190° C. under a load of 21.6 kg of from 1 g/10 min to 80 g/10 min and a density of from 0.90 g/cm³ to 0.97 g/cm³,
b) melting the polyethylene composition;
c) passing the melt through a combination of screens consisting of screens having a mesh opening of at least 205 μm and comprising at least two screens having a mesh opening of from 205 μm to 350 μm; and
e) pelletizing the molten polyethylene composition.

We have further found the use of a polyethylene composition obtained by such a process for the preparation of films, fibers, pipes, blow-molded articles, injection-molded articles, compression-molded articles or rotomolded articles and films, fibers, pipes, blow-molded articles, injection-molded articles, compression-molded articles or rotomolded articles prepared from a polyethylene composition obtained by such a process.

DETAILED DESCRIPTION OF THE INVENTION

The polyethylene composition provided to the process of the present invention can be an ethylene homopolymer or an ethylene copolymer, i.e. a copolymer of ethylene and at least one other olefin, preferably at least one other 1-olefin, i.e. a hydrocarbon having a terminal double bond. Preferably the polyethylene composition is an ethylene copolymer. Suitable comonomers can be functionalized olefinically unsaturated compounds such as ester or amide derivatives of acrylic or methacrylic acid, for example acrylates, methacrylates, or acrylonitrile. Preference is given to nonpolar olefinic compounds, including aryl-substituted 1-olefins. Particularly preferred 1-olefins are linear or branched $C_3$-$C_{12}$-1-alkenes, in particular linear $C_3$-$C_{10}$-1-alkenes such as propylene, 1-butene, 1-pentene, 1-hexene, 1-heptene, 1-octene, 1-decene or branched $C_2$-$C_{10}$-1-alkenes such as 4-methyl-1-pentene, conjugated and nonconjugated dienes such as 1,3-butadiene, 1,4-hexadiene or 1,7-octadiene or vinylaromatic compounds such as styrene or substituted styrene. It is also possible to polymerize mixtures of various 1-olefins. Suitable comonomers also include ones in which the double bond is part of a cyclic structure which can have one or more ring systems. Examples are cyclopentene, norbornene, tetracyclododecene or methylnorbornene or dienes such as 5-ethylidene-2-norbornene, norbornadiene or ethylnorbornadiene. It is also possible to copolymerize ethylene with mixtures of two or more other olefins. Most preferably the polyethylene composition is an ethylene copolymer of ethylene with 1-butene, 1-pentene, 1-hexene and/or 1-octene.

The ethylene content of the polyethylene composition is preferably from 50 to 100 wt.-%, more preferably from 60 to 99 wt.-%, and in particular from 80 to 98 wt.-%. Accordingly, the content of other olefins in the polyethylene composition is preferably from 0 to 50 wt.-%, more preferably from 1 to 40 wt.-%, and in particular from 2 to 20 wt.-%.

The density of polyethylene compositions suitable for the present invention is from 0.90 g/cm$^3$ to 0.97 g/cm$^3$. Preferably the density is in the range of from 0.92 to 0.96 g/cm$^3$ and especially in the range of from 0.93 to 955 g/cm$^3$. The density has to be understood as being the density determined according to DIN EN ISO 1183-1:2004, Method A (Immersion) with compression molded plaques of 2 mm thickness which were pressed at 180° C., 20 MPa for 8 minutes with subsequent crystallization in boiling water for 30 minutes.

The melt flow rate MFR$_{21.6}$ at 190° C. under a load of 21.6 kg of the polyethylene compositions, determined according to DIN EN ISO 1133:2005 condition G, is from 1 g/10 min to 80 g/10 min, preferably from 2 g/10 min to 50 g/10 min and especially from 5 g/10 min to 25 g/10 min.

The polyethylene composition of the present invention can be monomodal, bimodal or multimodal. With respect to the present invention monomodal, bimodal or multimodal refers to the modality of the molecular weight distribution. A monomodal distribution means that the molecular weight distribution has a single maximum. A bimodal molecular weight distribution means that the molecular weight distribution has at least two points of inflection on one flank. The molar mass distribution of polyethylene composition is preferably monomodal, bimodal or trimodal and in particular monomodal or bimodal. The ethylene copolymer compositions have in addition to the molecular weight distribution a comonomer distribution, wherein preferably the average comonomer content of polymer chains with a higher molecular weight is higher than the average comonomer content of polymer chains with a lower molecular weight, i.e. the comonomer distribution is a so-called inverse comonomer distribution.

Suitable polyethylene compositions for the present invention have preferably a polydispersity index $M_w/M_n$ in the range of from 5 to 80, more preferably in the range of from 10 to 60 and especially from in the range of 15 to 40. The polydispersity index is calculated by dividing the weight average molecular weight $M_w$ by the number average molecular weight $M_n$. The values $M_w$ and $M_n$ have to be understood as being determined by means of high-temperature gel permeation chromatography using a method described in ISO 16014-1:2003(E) and ISO 16014-4:2003(E).

The polyethylene composition of the present invention is preferably obtained at temperatures in the range from –20° C. to 200° C., preferably from 25° C. to 150° C. and particularly preferably from 40° C. to 130° C., and under pressures of from 0.1 MPa to 20 MPa and particularly preferably from 0.3 MPa to 5 MPa. All industrially known low-pressure polymerization methods can be used. The polymerization can be carried out batchwise or preferably continuously in one or more stages. Solution processes, suspension processes, stirred gas-phase processes and gas-phase fluidized-bed processes are all possible. Processes of this type are generally known to those skilled in the art. Among the polymerization processes mentioned, gas-phase polymerization, in particular in gas-phase fluidized-bed reactors and suspension polymerization, in particular in loop reactors or stirred tank reactors, are preferred.

In a preferred embodiment of the present invention the polymerization process is a suspension polymerization in a suspension medium, preferably in an inert hydrocarbon such as isobutane or mixtures of hydrocarbons or else in the monomers themselves. Suspension polymerization temperatures are usually in the range from –20° C. to 115° C., preferably from 50° C. to 110° C. and particularly preferably from 60° C. to 100° C., and the pressure is in the range of from 0.1 MPa to 10 MPa and preferably from 0.3 MPa to 5 MPa. The solids content of the suspension is generally in the range of from 10 wt.-% to 80 wt.-%. The polymerization can be carried out both batchwise, e.g. in stirred autoclaves, and continuously, e.g. in tubular reactors, preferably in loop reactors. In particular, it can be carried out by the Phillips PF process as described in U.S. Pat. Nos. 3,242,150 and 3,248,179.

Suitable suspension media are all media which are generally known for use in suspension reactors. The suspension medium should be inert and be liquid or supercritical under the reaction conditions and should have a boiling point which is significantly different from those of the monomers and comonomers used in order to make it possible for these starting materials to be recovered from the product mixture by distillation. Customary suspension media are saturated hydrocarbons having from 4 to 12 carbon atoms, for example isobutane, butane, propane, isopentane, pentane and hexane, or a mixture of these, which is also known as diesel oil.

In a preferred suspension polymerization process, the polymerization takes place in a cascade of two or preferably three or four stirred vessels. The molecular weight of the polymer fraction prepared in each of the reactors is preferably set by addition of hydrogen to the reaction mixture. The polymerization process is preferably carried out with the highest hydrogen concentration and the lowest comonomer concentration, based on the amount of monomer, being set in the first reactor. In the subsequent further reactors, the hydrogen concentration is gradually reduced and the comonomer concentration is altered, in each case once again based on the amount of monomer.

A further, preferred suspension polymerization process is suspension polymerization in loop reactors, where the polymerization mixture is pumped continuously through a cyclic reactor tube. As a result of the pumped circulation, continual mixing of the reaction mixture is achieved and the catalyst introduced and the monomers fed in are distributed in the reaction mixture. Furthermore, the pumped circulation prevents sedimentation of the suspended polymer. The removal of the heat of reaction via the reactor wall is also promoted by the pumped circulation. In general, these reactors consist essentially of a cyclic reactor tube having one or more ascending legs and one or more descending legs which are enclosed by cooling jackets for removal of the heat of reaction and also horizontal tube sections which connect the vertical legs. The impeller pump, the catalyst feed facilities and the monomer feed facilities and also the discharge facility, thus normally the settling legs, are usually installed in the lower tube section. However, the reactor can also have more than two vertical tube sections, so that a meandering arrangement is obtained.

The polymer is generally discharged continuously from the loop reactor via settling legs. The settling legs are vertical attachments which branch off from the lower reactor tube section and in which the polymer particles can sediment. After sedimentation of the polymer has occurred to a particular degree, a valve at the lower end of the settling legs is briefly opened and the sedimented polymer is discharged discontinuously.

Preferably, the suspension polymerization is carried out in the loop reactor at an ethylene concentration of at least 5 mole percent, preferably 10 mole percent, based on the suspension medium. In this context, suspension medium does not mean the fed suspension medium such as isobutane alone but rather the mixture of this fed suspension medium with the monomers dissolved therein. The ethylene concentration can easily be determined by gas-chromatographic analysis of the suspension medium.

In a further preferred embodiment of the present invention the polymerization process is carried out in a gas-phase reactor. Such a gas-phase reactor can be horizontally or vertically stirred or it can be a fluidized-bed reactor or a gas-phase reactor with a circulating bed.

Particular preference is given to gas-phase polymerization in a fluidized-bed reactor, in which the circulated reactor gas is fed in at the lower end of a reactor and is taken off again at its upper end. When such a process is employed for the polymerization of 1-olefins, the circulated reactor gas is usually a mixture of the 1-olefins to be polymerized, inert gases such as nitrogen and/or lower alkanes such as ethane, propane, butane, pentane or hexane and optionally a molecular weight regulator such as hydrogen. The use of nitrogen or propane as inert gas, if appropriate in combination with further lower alkanes, is preferred. The velocity of the reactor gas has to be sufficiently high firstly to fluidize the mixed bed of finely divided polymer present in the tube and serving as polymerization zone and secondly to remove the heat of polymerization effectively. The polymerization can also be carried out in a condensed or super-condensed mode, in which part of the circulating gas is cooled to below the dew point and returned to the reactor separately as a liquid and a gas phase or together as a two-phase mixture in order to make additional use of the enthalpy of vaporization for cooling the reaction gas.

In gas-phase fluidized-bed reactors, it is advisable to work at pressures of from 0.1 MPa to 10 MPa, preferably from 0.5 MPa to 8 MPa and in particular from 1.0 MPa to 3 MPa. In addition, the cooling capacity depends on the temperature at which the polymerization in the fluidized bed is carried out. The process is advantageously carried out at temperatures of from 30° C. to 160° C., particularly preferably from 65° C. to 125° C., with temperatures in the upper part of this range being preferred for copolymers of relatively high density and temperatures in the lower part of this range being preferred for copolymers of lower density.

It is also possible to use a multizone reactor in which two polymerization zones are linked to one another and the polymer is passed alternately a plurality of times through these two zones, with the two zones also being able to have different polymerization conditions. Such a reactor is described, for example, in WO 97/04015 and WO 00/02929.

In a preferred embodiment of the present invention the polyethylene composition is obtained by polymerizing in a cascade of at least two polymerization reactors and especially in a cascade of two or three polymerization reactor. The reactors of the cascade can be of the same kind such as, for example, two or three loop reactors, two or three stirred reactors, two fluidized-bed reactors or two multizone reactors. It is however also possible to combined different kinds of polymerization reactors such as one or two loop reactors and a fluidized-bed reactor or a combination of a fluidized-bed reactor and a multizone reactor. Such cascades for preparing polyethylene compositions are for example described in EP 1195388 A1, WO 2005/077992, EP 1057834 A1, or WO 2005/019280. A parallel arrangement of reactors using two or more different or identical processes is also possible.

The polymerization can be carried out using all customary olefin polymerization catalysts. That means the polymerization can be carried out using Phillips catalysts based on chromium oxide, using titanium-based Ziegler- or Ziegler-Natta-catalysts, or using single-site catalysts. For the purposes of the present invention, single-site catalysts are catalysts based on chemically uniform transition metal coordination compounds. Particularly suitable single-site catalysts are those comprising bulky sigma- or pi-bonded organic ligands, e.g. catalysts based on mono-Cp complexes, catalysts based on bis-Cp complexes, which are commonly designated as metallocene catalysts, or catalysts based on late transition metal complexes, in particular iron-bisimine complexes. Furthermore, it is also possible to use mixtures of two or more of these catalysts for the polymerization of olefins. Such mixed catalysts are often designated as hybrid catalysts. The preparation and use of these catalysts for olefin polymerization are generally known.

Preferred catalysts are catalysts of the Phillips type, which are preferably prepared by applying a chromium compound to an inorganic support and subsequently calcinating this at temperatures in the range from 350 to 950° C., resulting in chromium present in valences lower than six being converted into the hexavalent state. Apart from chromium, further elements such as magnesium, calcium, boron, aluminum, phosphorus, titanium, vanadium, zirconium or zinc can also be used. Particular preference is given to the use of titanium, zirconium or zinc. Combinations of the abovementioned elements are also possible. The catalyst precursor can be doped with fluoride prior to or during calcination. As supports for Phillips catalysts, which are also known to those skilled in the art, mention may be made of aluminum oxide, silicon dioxide (silica gel), titanium dioxide, zirconium dioxide or their mixed oxides or cogels, or aluminum phosphate. Further suitable support materials can be obtained by modifying the pore surface area, e.g. by means of compounds of the elements boron, aluminum, silicon or phosphorus. Preference is given to using a silica gel. Preference is given to spherical or granular silica gels, with the former also being able to be spray dried. The activated chromium catalysts can subsequently be prepolymerized or pre-reduced. The pre-reduction is usually carried out by means of cobalt or else by means of hydrogen at 250° C. to 500° C., preferably at 300° C. to 400° C., in an activator.

Preferred catalysts are further catalysts of the Ziegler type preferably comprising a compound of titanium or vanadium, a compound of magnesium and optionally a particulate inorganic oxide as support.

As titanium compounds, use is generally made of the halides or alkoxides of trivalent or tetravalent titanium, with titanium alkoxy halogen compounds or mixtures of various titanium compounds also being possible. Examples of suitable titanium compounds are $TiBr_3$, $TiBr_4$, $TiCl_3$, $TiCl_4$, $Ti(OCH_3)Cl_3$, $Ti(OC_2H_5)Cl_3$, $Ti(O-i-C_3H_7)Cl_3$, $Ti(O-n-C_4H_9)C_{13}$, $Ti(OC_2H_5)Br_3$, $Ti(O-n-C_4H_9)Br_3$, $Ti(OCH_3)_2Cl_2$, $Ti(OC_2H_5)_2Cl_2$, $Ti(O-n-C_4H_9)_2C_{12}$, $Ti(OC_2H_5)_2Br_2$, $Ti(OCH_3)_3Cl$, $Ti(OC_2H_5)_3Cl$, $Ti(O-n-C_4H_9)_3Cl$, $Ti(OC_2H_5)_3Br$, $Ti(OCH_3)_4$, $Ti(OC_2H_5)_4$ or $Ti(O-n-C_4H_9)_4$. Preference is given to using titanium compounds which comprise chlorine as the halogen. Preference is likewise given to titanium halides which comprise only halogen in addition to titanium and among these especially titanium chlorides and in particular titanium tetrachloride. Among the vanadium compounds, particular mention may be made of the vanadium halides, the vanadium oxyhalides, the vanadium alkoxides and the vanadium acetylacetonates. Preference is given to vanadium compounds in the oxidation states 3 to 5.

In the production of the solid component, at least one compound of magnesium is preferably additionally used. Suitable compounds of this type are halogen-comprising magnesium compounds such as magnesium halides and in particular the chlorides or bromides and magnesium compounds from which the magnesium halides can be obtained in a customary way, e.g. by reaction with halogenating agents. For the present purposes, halogens are chlorine, bromine, iodine or fluorine or mixtures of two or more halogens, with preference being given to chlorine or bromine and in particular chlorine.

Possible halogen-comprising magnesium compounds are in particular magnesium chlorides or magnesium bromides. Magnesium compounds from which the halides can be obtained are, for example, magnesium alkyls, magnesium aryls, magnesium alkoxy compounds or magnesium aryloxy compounds or Grignard compounds. Suitable halogenating agents are, for example, halogens, hydrogen halides, $SiCl_4$ or $CCl_4$ and preferably chlorine or hydrogen chloride.

Examples of suitable, halogen-free compounds of magnesium are diethylmagnesium, di-n-propylmagnesium, diisopropylmagnesium, di-n-butylmagnesium, di-sec-butylmagnesium, di-tert-butylmagnesium, diamylmagnesium, n-butylethylmagnesium, n-butyl-sec-butylmagnesium, n-butyloctylmagnesium, diphenylmagnesium, diethoxymagnesium, di-n-propyloxymagnesium, diisopropyloxymagnesium, di-n-butyloxymagnesium, di-sec-butyloxymagnesium, di-tert-butyloxymagnesium, diamyloxymagnesium, n-butyloxyethoxymagnesium, n-butyloxy-sec-butyloxymagnesium, n-butyloxyoctyloxymagnesium and diphenoxymagnesium. Among these, preference is given to using n-butylethylmagnesium or n-butyloctylmagnesium.

Examples of Grignard compounds are methylmagnesium chloride, ethylmagnesium chloride, ethylmagnesium bromide, ethylmagnesium iodide, n-propylmagnesium chloride, n-propylmagnesium bromide, n-butylmagnesium chloride, n-butylmagnesium bromide, sec-butylmagnesium chloride, sec-butylmagnesium bromide, tert-butylmagnesium chloride, tert-butylmagnesium bromide, hexylmagnesium chloride, octylmagnesium chloride, amylmagnesium chloride, isoamylmagnesium chloride, phenylmagnesium chloride and phenylmagnesium bromide.

As magnesium compounds for producing the particulate solids, preference is given to using, apart from magnesium dichloride or magnesium dibromide, the di($C_1$-$C_{10}$-alkyl) magnesium compounds. Preferably, the Ziegler-Natta catalyst comprises a transition metal selected from titanium, zirconium, vanadium, chromium.

Catalysts of the Ziegler type are usually polymerized in the presence of a cocatalyst. Preferred cocatalysts are organometallic compounds of metals of groups 1, 2, 12, 13 or 14 of the Periodic Table of Elements, in particular organometallic compounds of metals of group 13 and especially organoaluminum compounds. Preferred cocatalysts are for example organometallic alkyls, organometallic alkoxides, or organometallic halides.

Preferred organometallic compounds comprise lithium alkyls, magnesium or zinc alkyls, magnesium alkyl halides, aluminum alkyls, silicon alkyls, silicon alkoxides and silicon alkyl halides. More preferably, the organometallic compounds comprise aluminum alkyls and magnesium alkyls. Still more preferably, the organometallic compounds comprise aluminum alkyls, preferably trialkylaluminum compounds. Preferably, the aluminum alkyls comprise, for example, trimethylaluminum, triethylaluminum, tri-isobutylaluminum, tri-n-hexylaluminum and the like.

Preferred catalysts are furthermore mixed catalyst systems which have at least two different types of active sites derived from at least two chemically different starting materials. The different active sites can be active sites which are comprised in various single-site catalysts. However, it is also possible to use active sites which are derived from Ziegler-Natta catalysts or catalysts based on chromium, e.g. Phillips catalysts. The method of the present invention is especially suitable for mixed catalyst systems comprising late transition metal complexes, in particular iron-bisimine complexes, and at least one further mono-cp or bis-cp metallocene or a Ziegler catalyst.

In a preferred embodiment of the present invention the polyethylene composition is obtained by polymerizing using a mixed catalyst system. Such a polymerization can be carried out in a single polymerization reactor or in a series of polymerization reactors and is preferably carried out in a single polymerization reactor.

The melting of the polyethylene composition occurs preferably by heating in common devices for this purpose, such as extruders or continuous mixers, to which the polyethylene composition is usually fed in the as-polymerized form. These extruders or mixers can be single- or two-stage machines which melt the polyethylene composition. Examples of extruders are pin-type extruders, planetary extruders or corotating disk processors. Other possibilities are combinations of mixers with discharge screws and/or gear pumps. Preferred extruders are screw extruders, and these may be constructed as single- or twin-screw machines. Particular preference is given to twin-screw extruders and continuous mixers with discharge elements. Machinery of this type is conventional in the plastics industry and is manufactured by, for example, Coperion GmbH, Stuttgart, Germany; KraussMaffei Berstorff GmbH, Hannover, Germany; Leistritz Extrusionstechnik GmbH, Nürnberg, Germany; The Japan Steel Works LTD., Tokyo, Japan; Farrel Corporation, Ansonia, USA; or Kobe Steel, Ltd., Kobe, Japan. A melting of a polymer in such machinery is always accompanied by homogenizing the polymer.

The melting of the polyethylene composition is preferably carried out at from 150° C. to 350° C. and particularly preferably at from 180° C. to 300° C. As usually in the processing of polymers, it is further possible that the polyethylene compositions are not only melted but also furnished with one or more additives such as stabilizers, antioxidants, lubricants, antiblocking or antistatics agents, pigments or dyes.

According to the present invention the molten polyethylene composition is passed through a combination of screens consisting of screens having a mesh opening of at least 205 µm. That means, the combination of screens comprises no screens having a mesh opening of less than 205 µm. Screens for filtering polymer melts are common and can have different geometry. A overview of possible configurations of screens for filtering polymer melts is for example given by Gerhard Schönbauer, "Drahtgewebe (Siebgewebe) für das Filtrieren von Kunststoffschmelzen", in "Filtrieren von Kunststoffschmelzen", VDI Verlag GmbH, Düsseldorf, 1981.

The combination of screens of the present invention comprises at least two screens, which have a mesh opening in the range of from 205 µm to 350 µm, corresponding to a range of from 45 mesh to 72 mesh and have preferably a mesh opening in the range of from 210 µm to 300 µm, corresponding to a range of from 50 mesh to 70 mesh.

In a preferred embodiment of the present invention the combination of screens is a screen pack comprising from 2 to 8 screens having a mesh opening in the range of from 205 µm to 350 µm and in particular from 3 to 7 screens having a mesh opening in the range of from 205 µm to 350 µm. Preferably the combination of screens further comprises coarser screens, especially at the outside of the screen pack to provide an improved mechanical robustness of the screen pack. The screens having a mesh opening in the range of from 205 µm to 350 µm can be separated in the screen pack by coarser screens. Preferably they are however arranged directly in succession.

In a preferred embodiment of the present invention the machines for melting the polyethylene composition are designed in a way that the polymer is not only transferred from the solid to the liquid state but that there occurs additional mixing of the melt. Such a step of mixing the melt of the polyethylene composition can be brought about, for example, by a specific geometry of the machinery such as the presence mixing elements in the screws. The process of the present invention can comprise one or more steps of mixing the melt of the polyethylene composition before or after passing the melt through the combination of screens. A step of mixing the molten polyethylene composition after passing the melt through the combination of screens for example take place if the device for melting the polyethylene composition is a two-stage machine such as, e.g., a combination of two extrudes, in which the combination of screens is arranged after the first extruder and the melt enters a second extruder in which a step of mixing the melt takes place. Which such kinds of devices it is also possible to pass the molten polyethylene composition more than once through a combination of screens according to the present invention, for example once after a first extruder and once after a second extruder.

Pelletizing the molten polyethylene composition can be carried out with all customary devices for granulating polymer melt. Usually pelletizing is achieved by passing the melt through a die and chopping the strand in into short segments. Suitable devices for pelletizing the melt are, for example, dry-face pelletizers, water-ring pelletizers, underwater pelletizers, centrifugal pelletizers or rotary-knife pelletizers.

The pelletized polyethylene composition resulting from the process of the present invention can be advantageously used to manufacture polyethylene articles for a number of distinct end applications, such as for example films, fibers, moldings, for example blow-molded, injection-molded, compression-molded or rotomolded articles, or pipes or cross-linkable pipes.

It can be extruded into pipes or injection or blow molded into articles or used to manufacture fibers or filaments. Preferably it is extruded or blown into films and in particular in films selected from the group of films for food uses, stretch films, hygienic films, films for office uses, sealing layers, automatic packaging films, composite and laminating films. Such films can have a thickness of from 5 µm to 2.5 mm. The films can for example be prepared via blown film extrusion with a thickness of from 5 µm to 250 µm or via flat film extrusion, such as cast film extrusion with a thickness of from 10 µm to 2.5 mm.

The films made from a polyethylene composition obtained by the process for homogenizing and pelletizing of the present invention are characterized by a low level of gels, as well of larger gels with a diameter of more than 450 µm as of smaller gels with a diameter below.

EXAMPLES

The melt flow rate $MFR_5$ was determined according to DIN EN ISO 1133:2005, condition T at a temperature of 190° C. under a load of 5 kg.

The melt flow rate $MFR_{21.6}$ was determined according to DIN EN ISO 1133:2005, condition G at a temperature of 190° C. under a load of 21.6 kg.

The Flow Rate Ratio FRR is the ratio of $MFR_{21.6}/MFR_5$

Density was determined according to DIN EN ISO 1183-1:2004, Method A (Immersion) with compression molded plaques of 2 mm thickness. The compression molded plaques were prepared with a defined thermal history: Pressed at 180° C., 20 MPa for 8 min with subsequent crystallization in boiling water for 30 min.

The gel count was determined by preparing a cast film, analyzing the film defects by means of an optical scanning device and classifying and counting the film defects according to their size (circle diameter). The films were prepared by an extruder (type ME20) equipped with a chill roll and winder, model CR-9, and analyzed by an optical film surface analyzer with flash camera system, model FTA100 (all components produced by OCS Optical Control Systems GmbH, Witten, Germany). The apparatus had the following characteristics

- screw diameter: 20 mm;
- screw length: 25 D;
- compression ratio: 3:1;
- screw layout 25 D: 10 D feeding, 3 D compression, 12 D metering;
- dimensions: 1360×650×1778 mm³ (L×W×H; without die);
- die width (slit die): 150 mm;
- resolution: 26 µm×26 µm;

and was operated under the following conditions

| | |
|---|---|
| T 1 | 230° C.; |
| T 2 | 230° C.; |
| T 3 | 230° C.; |
| T 4 (adapter) | 230° C.; |
| T 5 (die) | 230° C.; |
| die | slit die 150 mm; |
| take off speed | 3.0 m/min; |
| screw speed | to be adjusted to film thickness 50 µm; |
| throughput | 1.0 to 1.5 kg/h (target 1.15 kg/h); |
| air shower | on - 5 m³/h, |
| chill roll temperature | 50° C.; |
| vab chill roll | 4N; |
| winding tensile force | 4N, |
| draw off strength | 5N; |
| camera threshold | threshold 1: 75% - threshold 2: 65%. |

For starting the measurement, extruder and take off unit were set to the specified conditions and started with a material having a known gel level. The film inspection software was started when the extruder showed steady conditions of temperature and melt pressure. After having operated the extruder with the starting material for at least half an hour or after the gel count having reached the known gel level, the first sample to measure was fed to the extruder. After having reached a stable gel level for 45 minutes the counting process was started until the camera had inspected an area of at least 3 m² of film. Thereafter the next sample was fed to the extruder and after having reached again a stable gel count for 45 minutes the counting process for the next sample was started. The counting process was set for all samples in a way that the camera inspected an area of at least 3 m² of film and the number of measured defects per size-class was normalized to 1 m² of film.

For filtering the polymer melts, screens of the following dimensions were used:

| | |
|---|---|
| 40 mesh | corresponding to a mesh opening of 400 µm; |
| 60 mesh | corresponding to a mesh opening of 250 µm; |
| 70 mesh | corresponding to a mesh opening of 210 µm; |
| 100 mesh | corresponding to a mesh opening of 150 µm; |
| 200 mesh | corresponding to a mesh opening of 74 µm; |
| 300 mesh | corresponding to a mesh opening of 48 µm. |

Comparative Examples A to D and Examples 1 to 4

Powder of a bimodal polyethylene copolymer coming from a cascaded gas phase process was homogenized and formed to pellets. For obtaining the polyethylene copolymer, ethylene was polymerized in a first fluidized-bed gas phase reactor in the presence of hydrogen resulting in a polymer with a density of more than 0.955 g/cm$^3$ and the product was transferred to a second fluidized-bed gas phase reactor, in which polymerization of ethylene with 1-hexene as comonomer and an amount of hydrogen less than in the first reactor took place. The obtained polyethylene powder was pelletized in a LCM 50 mixer of Kobe Steel, Ltd. under the conditions indicated in Table 1. An additive package was added in an amount that the resulting pellets contained 1800 ppm Irganox 1010, 1200 ppm Irganox 168 and 1000 ppm calcium stearate. The extrusion was carried out in Comparative Examples A to D and Examples 1 to 4 without any changes in rotor setup, gate temperature or suction pressure.

Comparative Example A was performed without using a screen in pelletizing the polyethylene powder. The resulting polyethylene copolymer had after pelletizing without a screen a density of 0.948 g/cm$^3$, an MFR$_S$ of 0.23 g/10 min and an MFR$_{21.6}$ of 8.3 g/10 min.

In Comparative Examples B to D and in Examples 1 to 4, the melt was passed through screen packs of a different numbers of screens and different dimension, which were always fixed between coarser screens in order to have a good mechanical robustness of the screen pack. Table 1 shows the composition of the screen packs utilized in Comparative Examples A to D and Examples 1 to 4.

TABLE 1

| | |
|---|---|
| Comparative Example A | — |
| Comparative Example B | 40/100/40/20 |
| Comparative Example C | 40/200/40/20 |
| Comparative Example D | 40/300/40/20 |
| Example 1 | 40/70/70/70/70/40/20 |
| Example 2 | 40/60/60/60/60/60/40/20 |
| Example 3 | 40/60/60/60/60/60/60/40/20 |
| Example 4 | 40/60/60/60/60/60/60/60/40/20 |

The comparison of Comparative Examples A to D shows that by passing the molten polyethylene composition through a screen the number of large gels is reduced whereby the reduction is the more pronounced the finer the screen is.

Examples 1 to 4 prove that stacks of coarser screens are even more efficient for reducing the amount of larger gels. It is accordingly possible to obtain polyethylene compositions with reduced numbers of large gels by using such mechanically more stable screens with a lower tendency of plugging.

What is claimed is:

1. A process for homogenizing and pelletizing a polyethylene composition comprising the steps of:
    a) providing a polyethylene composition having a density of from 0.955 g/cm$^3$ to 0.97 g/cm$^3$, a polydispersity index M$_w$/M$_n$, in the range of from 15 to 40, and a melt flow rate MFR$_{21.6}$ at 190_° C. under a load of 21.6 kg of from 5 g/10 min to 25 g/10 min;
    b) melting the polyethylene composition;
    c) passing the melt through a combination of screens consisting of a first screen having a mesh opening of 210 μm and at least five screens having a mesh opening of from 210 μm to 250 μm; and
    e) pelletizing the molten polyethylene composition.

2. A process for homogenizing and pelletizing a polyethylene composition according to claim 1 further comprising one or more steps of mixing the melt of the polyethylene composition before or after passing the melt through the combination of screens.

3. A process for homogenizing and pelletizing a polyethylene composition according to claim 1, wherein the polyethylene composition is bimodal or multimodal.

4. A process for homogenizing and pelletizing a polyethylene composition according to claim 1, wherein polyethylene composition is an ethylene copolymer of ethylene with 1-butene, 1-pentene, 1-hexene and/or 1-octene.

5. A process for homogenizing and pelletizing a polyethylene composition according to claim 1, wherein polyethylene composition is obtained by polymerizing in suspension or in gas-phase at temperatures in the range of from −20° C. to 200° C., and under pressures of from 0.1 MPa to 20 MPa.

6. A process for homogenizing and pelletizing a polyethylene composition according to claim 1, wherein the polyeth-

TABLE 2

| | Comp. Ex. A | Comp. Ex. B | Comp. Ex. C | Comp. Ex. D | Ex. 1 | Ex. 2 | Ex. 3 | Ex. 4 |
|---|---|---|---|---|---|---|---|---|
| Mixer conditions | | | | | | | | |
| Throughput [kg/h] | 57 | 57 | 57 | 57 | 57 | 57 | 57 | 57 |
| Rotation (drive) [rpm] | 1200 | 1200 | 1200 | 1200 | 1200 | 1200 | 1200 | 1200 |
| Gate temperature [° C.] | 238 | 237 | 238 | 238 | 240 | 238 | 235 | 237 |
| Suction pressure [barg] | 2.0 | 2.0 | 2.0 | 2.0 | 2.0 | 2.0 | 2.0 | 2.0 |
| Spec. energy [kg/h] (main drive) | 330 | 323 | 325 | 326 | 322 | 322 | 317 | 319 |
| Torque | 149 | 146 | 147 | 147 | 145 | 146 | 143 | 144 |
| Gear pump pressure [barg] | 109 | 149 | 156 | 182 | 198 | 180 | 202 | 219 |
| Gel count | | | | | | | | |
| 450-600 μm [1/m$^2$] | 329 | 274 | 169 | 115 | 91 | 148 | 84 | 64 |
| 600-700 μm [1/m$^2$] | 75 | 30 | 28 | 22 | 2 | 9 | 1 | 2 |
| 700-1500 μm [1/m$^2$] | 71 | 8 | 13 | 5 | 0 | 0 | 0 | 0 |
| 1500-10000 μm [1/m$^2$] | 0 | 0 | 0 | 0 | 0 | 0 | 0 | 0 |
| >10000 μm [1/m$^2$] | 0 | 0 | 0 | 0 | 0 | 0 | 0 | 0 |
| Total number of gels >450 μm [1/m$^2$] | 475 | 312 | 210 | 142 | 93 | 157 | 85 | 66 | ylene composition is obtained by polymerizing in a cascade of at least two polymerization reactors.

7. A process for homogenizing and pelletizing a polyethylene composition according to claim 1 wherein the polyethylene composition is obtained by polymerizing using a mixed catalyst system.

8. The process of claim 1 comprising forming an article, wherein the article is a film, fiber, pipe, blow-molded article, injection molded article, compression molded article or roto-molded article comprising the polyethylene composition resulting from step e).

* * * * *